United States Patent [19]

Kikuchi et al.

[11] Patent Number: 5,410,356
[45] Date of Patent: Apr. 25, 1995

[54] SCANNING-LINE INTERPOLATION APPARATUS

[75] Inventors: Yasuhiro Kikuchi; Katsuji Aoki; Hiroaki Aono; Akiyoshi Tanaka, all of Kawasaki; Kosuke Kubota, Yokohama, all of Japan

[73] Assignee: Matsushita Electric Industrial Co., Ltd., Osaka, Japan

[21] Appl. No.: 866,629

[22] Filed: Apr. 10, 1992

[30] Foreign Application Priority Data

Apr. 19, 1991 [JP] Japan .................................. 3-088495
Sep. 5, 1991 [JP] Japan .................................. 3-225903
Oct. 15, 1991 [JP] Japan .................................. 3-265895
Jan. 30, 1992 [JP] Japan .................................. 4-014602

[51] Int. Cl.$^6$ ............................................. H04N 7/01
[52] U.S. Cl. ..................................... 348/452; 348/699
[58] Field of Search ......... 348/448, 451, 452, 699–701; 358/140; H04N 7/01

[56] References Cited

U.S. PATENT DOCUMENTS 4,862,267  8/1989  Gillard et al. .
5,012,337  4/1991  Gillard .................... 348/452
5,019,903  5/1991  Dougall et al. ............ 348/448

FOREIGN PATENT DOCUMENTS 0391094 10/1990 European Pat. Off. ..... H04N 7/010
0108886  4/1989 Japan .

Primary Examiner—James J. Groody
Assistant Examiner—David E. Harvey
Attorney, Agent, or Firm—Lowe, Price, LeBlanc & Becker

[57] ABSTRACT

A scanning-line interpolation apparatus for an image represented by a plurality of blocks of picture elements, provided with a motion vector detecting circuit for detecting an inter-frame motion vector of each block of an image represented by image information of a succeeding field, from image information of preceding and succeeding fields, a judgement circuit for generating and outputting predetermined data by using a detected motion vector of each block of the succeeding field and motion vectors of corresponding neighboring blocks thereof, a mixer circuit for outputting an interpolation signal obtained by mixing an inter-field interpolation signal representing an image obtained by moving another image represented by image information of the preceding field by a distance, which is one-half the magnitude of the detected motion vector of each block of the image represented by the image information of the succeeding field, in the direction of the motion vector with an intra-field interpolation signal representing an image obtained by performing an interpolation of scanning lines of a current field by using only image information of the current field at a mixing ratio, which is changed according to the predetermined data output from the judgement circuit, and a non-interlaced signal output circuit for outputting a non-interlaced signal obtained from the interpolation signal and a signal representing the image information of the current field.

3 Claims, 11 Drawing Sheets

HORIZONTAL DIRECTION

FIG. 4

| ABSOLUTE VALUE OF DIFFERENCE IN VERTICAL COMP OF MOTION VECTORS | ABSOLUTE VALUE OF DIFFERENCE IN HORIZONTAL COMP OF MOTION VECTORS | $S_n$ |
|---|---|---|
| 0 | 0 | 5 |
| 0 | 1 | 4 |
| 0 | 2 | 3 |
| 1 | 0 | 4 |
| 1 | 1 | 3 |
| 1 | 2 | 2 |
| 2 | 0 | 3 |
| 2 | 1 | 2 |
| 2 | 2 | 1 |
| * | 3 OR MORE | 0 |
| 3 OR MORE | * | 0 |

COMP: COMPONENTS
*: ANY

AVC: ABSOLUTE VALUE CALCULATING

SCANNING-LINE INTERPOLATION APPARATUS

BACKGROUND OF THE INVENTION

1. Field of The Invention

This invention relates to a scanning-line interpolation apparatus for converting signals representing an image obtained by an interlaced scanning to signals representing another image obtained by a non-interlaced scanning.

2. Description of The Related Art

A conventional apparatus for detecting a motion vector of an image and moving an image of the preceding field according to the detected motion vector to perform an interpolation of scanning lines is disclosed in, for example, Japanese Unexamined Patent Publication (Tokkyo Kokai Koho) Official Gazette No. 1-108886.

FIG. 1 is a schematic block diagram for illustrating the configuration of the conventional scanning-line interpolation apparatus. Reference numeral 31 denotes an input terminal, from which a signal representing image information obtained by what is called a 2:1 interlace scanning (namely, an odd-line interlacing) is input; 32 to 34 field memories; 35 a motion detecting circuit; 36 a mixer circuit; 37 and 38 time-base compression circuits; 39 a switching circuit; 40 an output terminal, from which a signal representing image information obtained as a result of a non-interlaced scanning; 41 a motion-vector detecting circuit; and 42 a position moving circuit.

When a signal representing image information obtained by a 2:1 interlace scanning is supplied to the input terminal 31, a signal representing image information of a current field is output from the field memory 33. Simultaneously, a signal representing image information of the succeeding field and a signal representing image information of the preceding field are output from the field memory 32 and the field memory 34, respectively. Then, the signal representing image information of the succeeding field and the signal representing image information of the preceding field are input to the motion vector detecting circuit 41 whereupon a motion vector corresponding to an inter-frame motion is detected. Subsequently, a signal representing the detected motion vector is input to the position moving circuit 42 whereupon an image represented by the image information of the preceding field is moved by a distance, which is one-half the magnitude of the motion vector, in the direction of the motion vector.

Meanwhile, the signal representing image information of the succeeding field and the signal representing image information of the preceding field are also input to the motion detecting circuit 35 whereupon a motion is detected with regard to each pixel from an absolute value of the difference in luminance between the preceding and succeeding fields.

An output signal of the position moving circuit 42 and the signal representing the image information of the preceding field are input to the mixer circuit 36. Thereafter, a signal obtained by mixing these signals is output therefrom. At that time, the mixer circuit 36 changes a mixing ratio according to the output of the motion detecting circuit 35.

Moreover, the signal representing the image information of the current field is input to the mixer circuit 36. In case where a motion vector cannot be detected by the motion vector detecting circuit 41, a signal representing a result of an interpolation of the scanning lines of the current field only according to the image information of tile current field is output from the mixer circuit 36.

The signal representing the image information of the current field and the signal output from the mixer circuit 36 are input to the time-base compression circuits 37 and 38, respectively, whereupon the image represented by the signal is compressed or reduced to a scale of half of the original size thereof with respect to time. Thereafter, the switching circuit 39 switches one of the outputs of the time-base compression circuits 37 and 38 to the other of the outputs thereof every horizontal scanning interval. Then, the selected output of the time-base compression circuits is output from the switching circuit 39. Thus a signal representing image information to be obtained by a non-interlaced scanning is output from the output terminal 40.

However, in case of the above described apparatus, an interpolation of the scanning lines of the current field is performed by mixing the signal representing the image information of the preceding field with the signal obtained by shifting the image by a distance, which is one-half the magnitude of the detected motion vector, in the direction of the motion vector. Therefore, if the detected motion vector is incorrect, an interpolation of the scanning lines is effected according to incorrect image information with the result that picture quality is degraded. Accordingly, it is necessary for preventing the degradation in picture quality to judge whether or not a motion vector is correctly detected and to obtain a signal representing the result of the interpolation of the scanning lines according to the judgement.

In case of an ordinary image, there is a high correlation between neighboring pixels. Hence, there is a high correlation between a motion vector detected in a block and another motion vector detected in a neighbouring block. Namely, in case where correct motion vectors are detected, there is a high correlation between motion vectors of neighbouring blocks. In contrast, in case where incorrect motion vectors are detected, there is a low correlation between motion vectors of neighbouring blocks. Therefore, it can be judged from a comparison of a motion vector detected in a block with another motion vector detected in a neighbouring block whether or not the motion vector is correctly detected in the block.

It is, accordingly, an object of the present invention to provide a scanning-line interpolation apparatus which can prevent an interpolation of scanning lines from being performed according to an incorrect motion vector by judging whether or not a detected motion vector is correct and also prevent the degradation in picture quality.

Meanwhile, it is confirmed that human visual perception extracts structural features such as edge portions included in an image. Therefore, if a motion vector detected in a block containing an edge portion is incorrect, there occurs deterioration in picture quality of an edge portion, which is especially apt to come under a viewer's notice. Consequently, this leads to degradation in visual picture quality of an entire image.

It is, accordingly, another object of the present invention to provide a scanning-line interpolation apparatus which converts a signal representing an image, which is obtained by a 2:1 interlaced scanning, to a signal representing an image, which should be obtained by a non-interlaced scanning, by judging whether or not a detected motion vector is correct, and changing judging conditions with regard to an edge portion, which is especially apt to come under a viewer's notice, to thereby prevent deterioration in picture quality of the image.

SUMMARY OF THE INVENTION

To achieve the foregoing object and in accordance with an aspect of the present invention, there is provided a scanning-line interpolation apparatus for an image represented by a plurality of blocks of picture elements, which comprises a motion vector detecting circuit for detecting an inter-frame motion vector of each block of an image represented by image information of a succeeding field, from the image information of a preceding field and the succeeding field, a judgement circuit for generating and outputting predetermined data by using a detected motion vector of each block of the succeeding field and motion vectors of corresponding neighbouring blocks thereof, a mixer circuit for outputting an interpolation signal obtained by mixing an inter-field interpolation signal representing an image obtained by moving another image represented by image information of the preceding field by a distance, which is one-half the magnitude of the detected motion vector of each block of the image represented by the image information of the succeeding field, in the direction of the motion vector with an intra-field interpolation signal representing an image obtained by performing an interpolation of scanning lines of a current field by using only image information of the current field at a mixing ratio, which is changed according to the predetermined data output from the Judgement circuit, and a non-interlaced signal output circuit for outputting a non-interlaced signal obtained from the interpolation signal and a signal representing the image information of the current field.

In accordance with another aspect of the present invention, there is provided a scanning-line interpolation apparatus for an image represented by a plurality of blocks of picture elements, which comprises a motion vector detecting circuit for detecting an inter-frame motion vector of each block of an image represented by image information of a succeeding field, from the image information of a preceding field and the succeeding field, a judgement circuit for judging from a comparison of a difference between the detected motion vector of each block of the succeeding field and a motion vector of each of neighbouring blocks thereof with a threshold value whether or not the detected motion vector of each block thereof is in agreement with a motion vector of each of neighbouring blocks thereof, a mixer circuit for outputting an interpolation signal obtained by mixing an inter-field interpolation signal representing an image obtained by moving another image represented by image information of the preceding field by a distance, which is one-half the magnitude of the detected motion vector of each block of the image represented by the image information of the succeeding field, in the direction of the motion vector with an intra-field interpolation signal representing an image obtained by performing an interpolation of scanning lines of a current field by using only image information of the current field at a mixing ratio, which is changed according to the number of the motion vectors of the neighbouring blocks, which are in agreement with the detected motion vector of each block, and a non-interlaced signal output circuit for outputting a non-interlaced signal obtained from the interpolation signal and a signal representing the image information of the current field.

In accordance with a further aspect of the present invention, there is provided a scanning-line interpolation apparatus for an image represented by a plurality of blocks of picture elements, which comprises a motion vector detecting circuit for detecting an inter-frame motion vector of each block of an image represented by image information of a succeeding field, from the image information of a preceding field and the succeeding field, a judgement circuit for calculating a difference between tile detected motion vector of each block of the succeeding field and a motion vector of each of neighbouring blocks thereof and for detecting and summing up predetermined values respectively corresponding to the calculated differences, a mixer circuit for outputting an interpolation signal obtained by mixing an inter-field interpolation signal representing an image obtained by moving another image represented by image information of the preceding field by a distance, which is one-half the magnitude of the detected motion vector of each block of the image represented by the image information of the succeeding field, in the direction of the motion vector with an intra-field interpolation signal representing an image obtained by performing an interpolation of scanning lines of a current field by using only image information of the current field at a mixing ratio, which is changed according to a total of the predetermined values respectively corresponding to the calculated differences, and a non-interlaced signal output circuit for outputting a non-interlaced signal obtained from the interpolation signal and a signal representing the image information of the current field.

In accordance with still another aspect of the present invention, there is provided a scanning-line interpolation apparatus, which comprises a motion vector detecting circuit for detecting an inter-frame motion vector of each block from image information of preceding and succeeding fields, a judgêment circuit for judging from a result of a comparison of an inter-field interpolation signal representing an image obtained by moving another image represented by image information of the preceding field by a distance, which is one-half the magnitude of the detected motion vector, in the direction of the motion vector with a signal representing an image of a current field whether or not the motion vector is valid, a switching circuit for selecting and outputting the inter-field interpolation signal in case where the motion vector is judged to be valid and for selecting and outputting an intra-field interpolation signal representing an image obtained by performing an interpolation of scanning lines of a current field by using only an image signal of the current field in case where the motion vector is judged to be invalid and a non-interlaced signal output circuit for outputting a non-interlaced signal obtained from the interpolation signal output from the switching circuit and a signal representing the image information of the current field.

Thereby, it can be Judged whether or not the detected motion vector is correct. Thus the apparatus of the present invention can prevent a wrong image signal from being mixed to an original image signal, which is obtained by the interlaced scanning, by performing an interpolation of scanning lines according to an incorrect motion vector. Consequently, the apparatus of the present invention can obtain a non-interlaced signal representing an image, the picture quality of which hardly is degraded.

In accordance with yet another aspect of the present invention, there is provided a scanning-line interpolation apparatus, which comprises a motion vector detecting circuit for detecting an inter-frame motion vector of each of blocks from image information of fields immediately preceding and succeeding a current field, an edge detecting circuit for detecting the presence or absence of an edge in each of blocks, which are the same as the blocks used for detecting the inter-frame motion, respectively, from an image represented by an image signal representing the image information of the current field, a judgement circuit for calculating a difference between the detected motion vector of each block and a motion vector of each of neighbouring blocks and determining from a comparison of the difference with a threshold value predetermined according to the presence or absence of an edge what number of the motion vectors of the neighbouring blocks are in agreement with the detected motion vector of each block, a mixer circuit for outputting an interpolation signal obtained by mixing an inter-field interpolation signal representing an image obtained by moving another image represented by image information of the preceding field by a distance, which is one-half the magnitude of the detected motion vector, in the direction of the motion vector with a intra-field interpolation signal representing an image obtained by performing an interpolation of scanning lines of a current field by using only image information of the current field at a mixing ratio, which is changed according to the number of the motion vectors of the neighbouring blocks, which are in agreement with the detected motion vector of each block, and a non-interlaced signal output circuit for outputting a non-interlaced signal obtained from the interpolation signal obtained by mixing the inter-field interpolation signal and a signal representing the image information of the current field.

As previously described, generally, there is a high correlation between neighbouring pixels of the same image. Hence, when pixels of an image are partitioned into blocks, each of which has M×N pixels, and a motion vector of each block is detected (incidentally, M and N are positive integers), there is a high correlation between a motion vector detected in a block in question and another motion vector detected in each block adjacent to the block in question if the motion vector detected in the block in question is correct. Namely, if there is a high correlation between a motion vector detected in a block in question and another motion vector detected in each block adjacent to the block in question, the motion vector detected in a block in question can be judged to be correct. Conversely, if there is a low correlation between a motion vector detected in a block in question and another motion vector detected in each block adjacent to the block in question, the motion vector detected in a block in question can be judged to be incorrect.

Thus the apparatus of the present invention makes a comparison of a motion vector detected in a block in question with another motion vector detected in each block adjacent to the block in question. The degree of the correlation between the motion vector detected in the block in question and another motion vector detected in each block adjacent to the block in question can be determined on the basis of the number of motion vectors detected in the adjacent blocks which are judged to be in agreement with the motion vector detected in question. Namely, it can be thus determined whether or not the motion vector is correctly detected in the block in question.

Moreover, if the difference between the motion vector detected in the block in question and the motion vector detected in each block contiguous to the block in question is less than or equal to a threshold value predetermined according to the presence or absence of an edge in the block in question, the motion vector detected in the block in question is judged to be in agreement with the motion vector detected in each block contiguous to the block in question. In contrast, if greater than the threshold value, the former is judged not to be in agreement with the latter. Additionally, the threshold value to be used for the judgement is set in such a manner that a threshold value in case where there is an edge in the block in question becomes less than another threshold value in case where there is no edge therein. Thereby, in case where there is an edge in the block in question, a criterion used for Judging whether or not the motion vector detected in the block in question is in agreement with the motion vector detected in each block contiguous to the block in question becomes stricter in comparison with a case where there is no edge in the block in question. Therefore, the number of the motion vectors detected in the contiguous blocks judged to be in agreement with the motion vector detected in the block in question, which is used as the criterion, tends to decrease. As the result, the apparatus of the present invention can further prevent an incorrect motion vector from being detected in an edge portion which is especially noticeable.

Thereby, the apparatus of the present invention can judge whether or not a detected motion vector is correct. Further, the apparatus of tile present invention can prevent an interpolation of wrong image signals from being performed according to an incorrect motion vector. Consequently, the apparatus of the present invention can obtain a non-interlaced signal representing an image, the picture quality of which scarcely is degraded.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 4 is a diagram for illustrating a table to be used for controlling a mixer circuit of the apparatus of FIG. 2;

DETAILED DESCRIPTION OF THE PREFERRED EMBODIMENTS

Hereinafter, preferred embodiments of the present invention will be described in detail by referring to the accompanying drawings.

Figure 1:
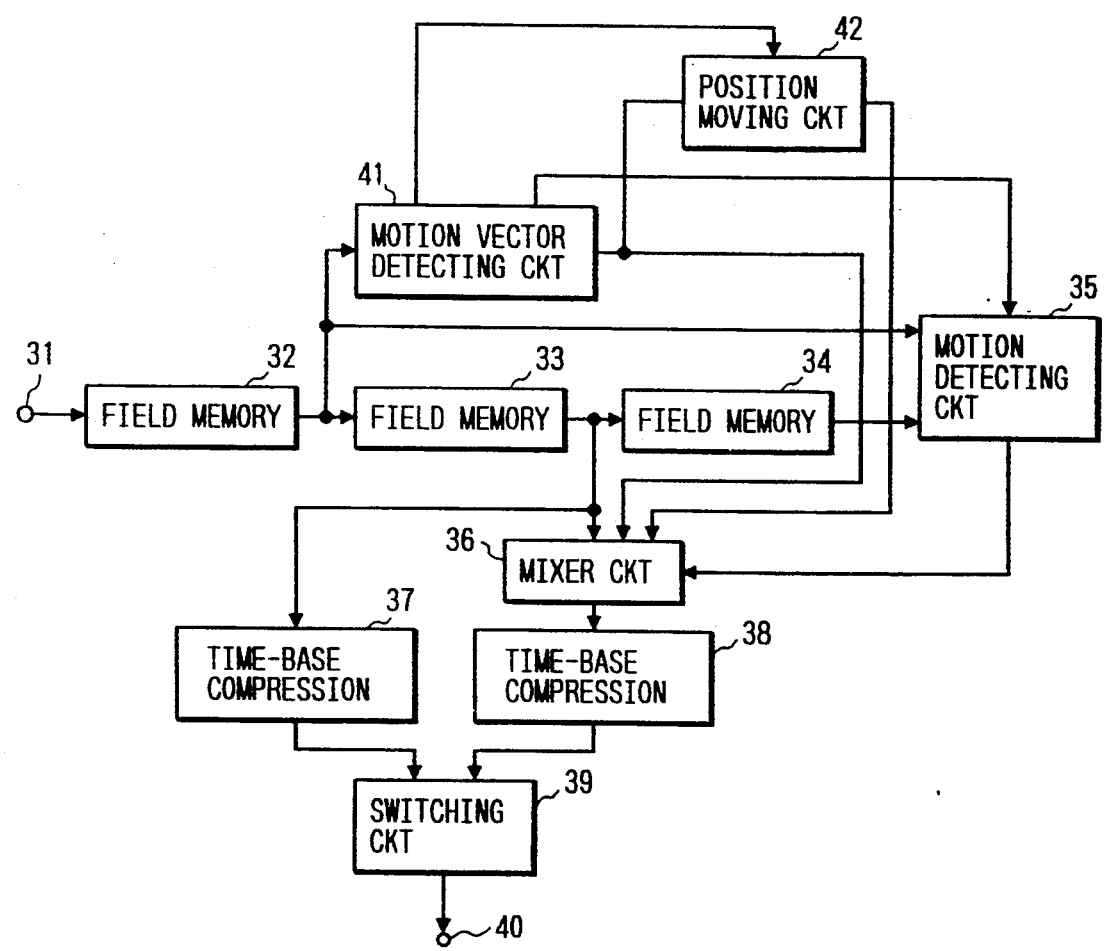
FIG. 1 is a schematic block diagram for illustrating the configuration of a conventional scanning-line interpolation apparatus.
Figure 2:
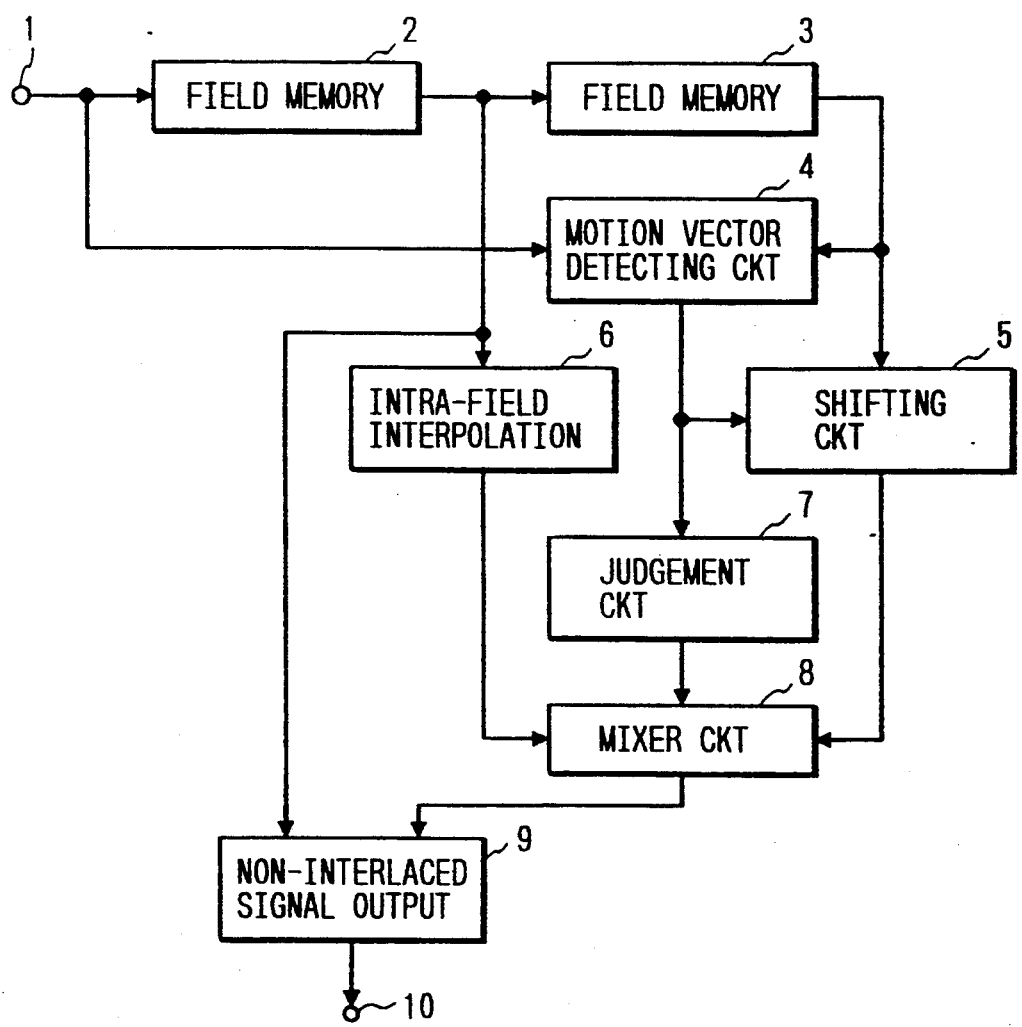
FIG. 2 is a schematic block diagram for illustrating the configuration of a scanning-line interpolation apparatus embodying the present invention.

Referring to FIG. 2, there is shown the configuration of a scanning-line interpolation apparatus (hereunder sometimes referred to as a first embodiment) embodying the present invention. Reference numeral 1 denotes an input terminal from which a signal representing image information obtained by a 2:1 interlaced scanning (hereunder sometimes referred to as 2:1 interlaced image information) is input; 2 and 3 field memories for storing the image information; 4 a motion vector detecting circuit for detecting an inter-frame motion vector in each block; 5 a shifting circuit for shifting an image represented by image information of a preceding field by a distance, which is one-half the magnitude of the detected motion vector, in the direction of the detected motion vector; 6 an intra-field interpolation circuit for obtaining an intra-field interpolation signal by performing an interpolation of scanning lines of a current field by using only image information of the current field; 7 a judgement circuit for judging whether or not a motion vector is correctly detected by the motion vector detecting circuit 4; 8 a mixer circuit for obtaining and outputting an interpolation signal by mixing the inter-field interpolation signal with the intra-field interpolation signal; 9 a non-interlaced signal output circuit for obtaining and outputting an non-interlaced signal by adding the interpolation signal to a signal representing scanning lines of an image represented by the image information of the current field; and 10 an output terminal from which image information represented by the non-interlaced signal is output.

Hereinafter, an operation of the scanning-line interpolation apparatus of FIG. 2 will be described. First, a signal representing the 2:1 interlaced image information of a succeeding field is supplied to the input terminal 1. Further, a signal representing the image information of the current field is output from the field memory 2. Moreover, a signal representing the image information of the preceding field is output from the field memory 3.

The signal representing the image information of the preceding information, as well as the signal representing the image information of the succeeding field supplied to the input terminal 1, is input to the motion vector detecting circuit 4 whereupon an inter-frame motion vector is detected in each block. Then, a signal representing each of the detected motion vector is input to both of the shifting circuit 5 and the judgement circuit 7.

An inter-field motion vector is obtained from the inter-frame motion vector by reducing the magnitude thereof by half. Thus, in order to obtain an inter-field interpolation signal, the shift circuit 5 shifts the image represented by the image information of the preceding field by a distance, which is one-half the magnitude of the motion vector detected by the motion vector detecting circuit, in the direction of the detected motion vector. Then, a signal representing the shifted image is input to the mixer circuit 8.

Figure 3:
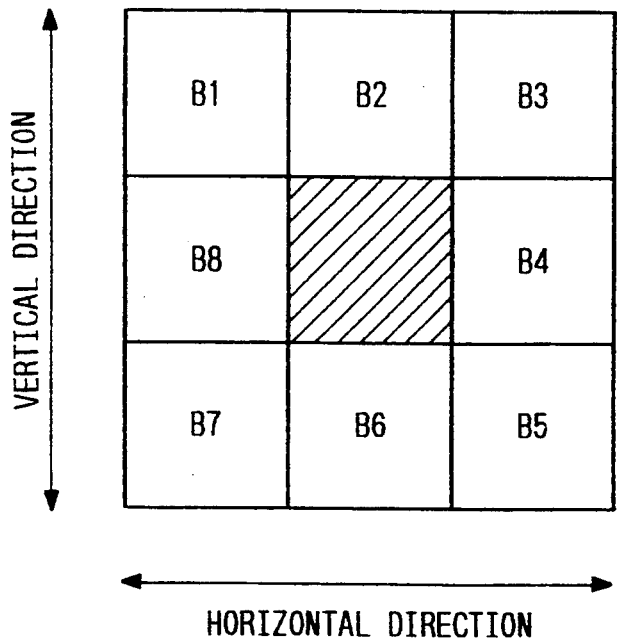
FIG. 3 is a diagram for illustrating an operation of a judgement circuit which is a primary part of the apparatus of FIG. 2.

Incidentally, if an inter-field interpolation is effected by using an incorrect motion vector, picture quality is deteriorated. Thus, there is necessity of judging whether or not the motion vector is correctly detected. As described above, generally, there is a high correlation between neighbouring pixels. Thus, there is a high correlation between a motion vector detected in a block and another motion vector detected in a neighbouring block. Namely, in case where a correct motion vector is detected in a block, there is obtained a high correlation between the motion vector detected in the block and a motion vector of each block adjacent to the block. In contrast, in case where an incorrect motion vector is detected, there is obtained a low correlation between the motion vector detected in tile block and a motion vector of each block adjacent to the block. Therefore, the judgement circuit 7 compares a motion vector detected in a shaded block of FIG. 3 with a motion vector detected in each of neighbouring blocks $B_1$ to $B_8$ and judges whether or not the motion vector detected in the shaded block is in agreement with the motion vector detected in each of the neighbouring blocks. Thus the Judgement circuit 7 controls the mixer circuit 8. Additionally, if the difference between the motion vector detected in the shaded block and the motion vector detected in the neighboring block is less than or equal to a threshold value, these vectors are judged to be in agreement with each other. Conversely, if the difference between the motion vector detected in the shaded block and the motion vector detected in the neighbouring block is greater than the threshold value, these vectors are judged not to be in agreement with each other. Alternatively, the judgement may be made as follows. Namely, if the total of values of parameters, each of which corresponds to the difference between the motion vector detected in the shaded block and the motion vector detected in each of the neighbouring block, is greater than or equal to a threshold value, these vectors are judged to be in agreement with each other. Conversely, if the total of values of the parameter is less than the threshold value, these vectors are Judged not to be in agreement with each other. Practically, the judgement circuit 7 finds each of values $S_1$ to $S_8$, which corresponds to the difference between the motion vector detected in the shaded block of FIG. 3 and tile motion vector detected in each of the neighbouring blocks, by referring to the table of FIG. 4. Then, the circuit 7 calculates a total of the values $S_1$ to $S_8$ and controls the mixer circuit 8 according to the calculated total of the values $S_1$ to $S_8$. Namely, if the total of the values $S_1$ to $S_8$ is large (namely, is close to 40), the motion vector detected in the shaded block of FIG. 3 is judged to be in agreement with the motion vector detected in each of the neighbouring blocks. In contrast, if small, the former is judged not to be in agreement with the latter.

Meanwhile, the intra-field interpolation circuit 6 performs an interpolation of scanning lines of the current field by using only the image information of the current field and obtains an intra-field interpolation signal representing results of such an interpolation (namely, an intra-field interpolation).

If the resolution abruptly changes at the border between a region, in which an inter-field interpolation is effected, and another region, in which an intra-field interpolation is effected, an unnatural image is obtained. In order to eliminate such deterioration in picture quality, the mixer circuit 8 outputs an interpolation signal by mixing an inter-field interpolation signal with an intra-field interpolation signal. Namely, as the number of the motion vectors detected in the neighbouring blocks, which are in agreement with the motion vector detected in the shaded block of FIG. 3, increases, a ratio of the inter-field interpolation signal to be mixed with the intra-field interpolation signal is increased. In contrast, as the number of the motion vectors detected in the neighbouring blocks, which are in agreement with the motion vector detected in the shaded block of FIG. 3, decreases, a ratio of the intra-field interpolation signal to be mixed with the inter-field interpolation signal is increased. The interpolation signal thus obtained in the mixer circuit 8 is input to the non-interlaced signal output circuit 9. Practically, an intensity level Y represented by the interpolation signal is obtained by the following equation (1) from intensity levels $f_A$ and $f_B$ respectively indicated by the inter-field interpolation signal and the intra-field interpolation signal.

$$Y=(X/40) \cdot f_A + \{(1-X)/40\} \cdot f_B \qquad (1)$$

where X denotes the total of the values $S_1$ to $S_8$. Namely, as the total of the values $S_1$ to $S_8$ increases, a ratio of the inter-field interpolation signal $f_A$ to be mixed with the intra-field interpolation signal $f_B$ increases. Conversely, as the total of the values $S_1$ to $S_8$ decreases, a ratio of the intra-field interpolation signal $f_B$ to be mixed with the inter-field interpolation signal $f_A$ increases. The interpolation signal Y thus obtained in the mixer circuit 8 is input to the non-interlaced signal output circuit 9. Then, the non-interlaced signal output circuit 9 inserts the interpolation signal between the scanning lines represented by the image information of the current field. Thus a non-interlaced image signal representing an image, the picture quality of which hardly is degraded, is output from the non-interlaced signal output circuit 9.

Figure 5:
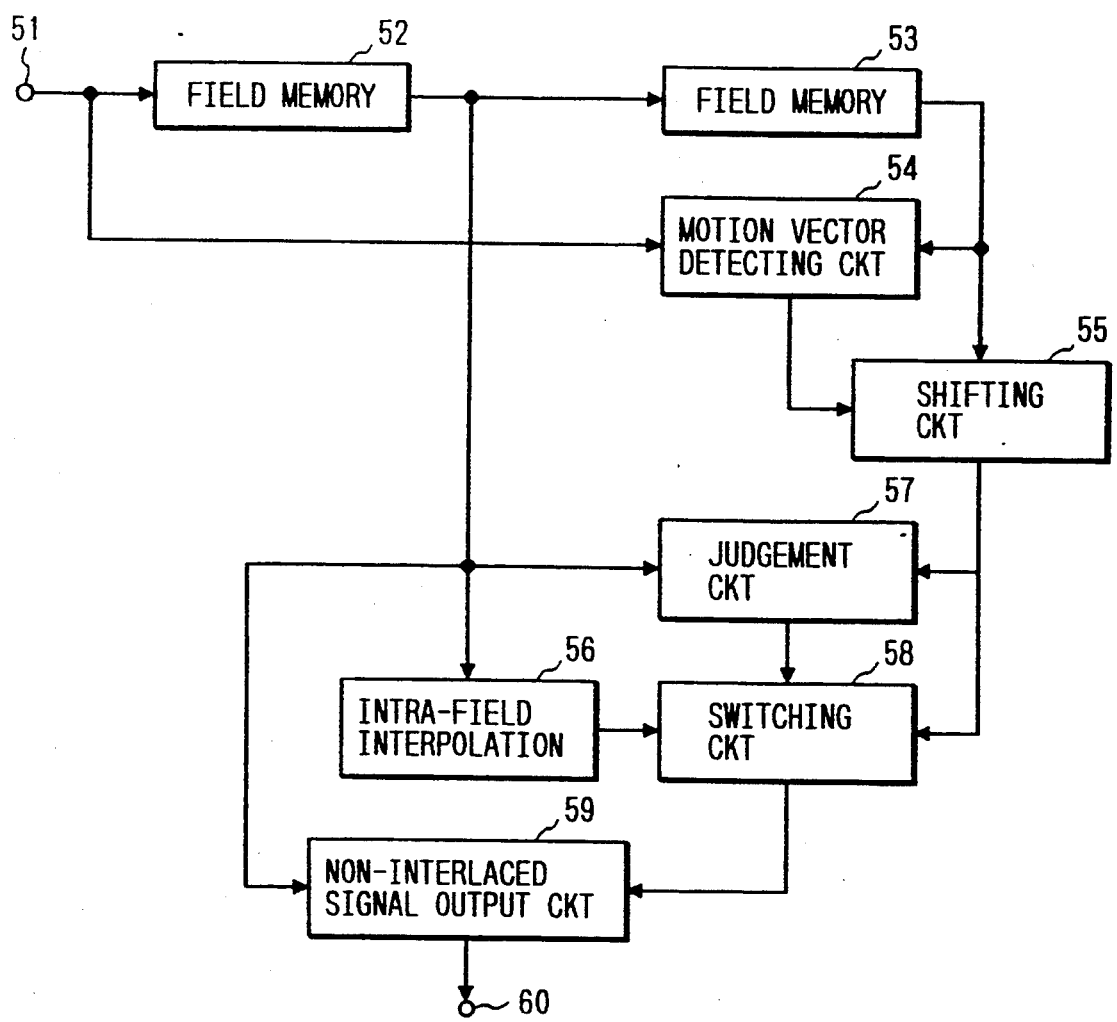
FIG. 5 is a schematic block diagram for illustrating the configuration of another scanning-line interpolation apparatus embodying the present invention.

Turning to FIG. 5, there is shown the configuration of a scanning-line interpolation apparatus (hereunder sometimes referred to as a second embodiment) embodying the present invention. Reference numeral 51 denotes an input terminal from which a signal representing 2:1 interlaced image information is input; 52 and 53 field memories for storing moving image signals; 54 a motion vector detecting circuit for detecting an inter-frame motion vector in each block; 55 a shifting circuit; 56 an intra-field interpolation circuit; 57 a judgement circuit; 58 a switching circuit; 59 a non-interlaced signal output circuit; and 60 an output terminal from which a non-interlaced image signal is output.

Hereinafter, an operation of the scanning-line interpolation apparatus of FIG. 5 will be described. First, a signal representing the 2:1 interlaced image information of a succeeding field is supplied to the input terminal 51.

Further, a signal representing the image information of a current field is output from the field memory 52. Moreover, a signal representing the image information of a preceding field is output from the field memory 53.

The signal representing the image information of the preceding information, as well as the signal representing the image information of the succeeding field supplied to the input terminal 51, is input to the motion vector detecting circuit 54 whereupon an inter-frame motion vector is detected in each block. Then, a signal representing each of the detected motion vector is input to the shifting circuit 5.

An inter-field motion vector is obtained from the inter-frame motion vector by reducing the magnitude thereof by half. Thus, in order to obtain an inter-field interpolation signal, the shift circuit 5 shifts the image represented by the image information of the preceding field by a distance, which is one-half the magnitude of the motion vector detected by the motion vector detecting circuit, in the direction of the detected motion vector. Subsequently, a signal representing the shifted image is input to both of the judgement circuit 57 and the switching circuit 58.

Incidentally, similarly as in case of the first embodiment, if an inter-field interpolation is effected by using an incorrect motion vector, picture quality is deteriorated. Thus, there is necessity of judging whether or not the motion vector is correctly detected. As previously described, generally, there is a high correlation between neighbouring pixels. Thus, there is a high correlation between image signals respectively corresponding to adjacent scanning lines. Hence, in case where scanning line corresponding to an incorrect image signal obtained by an interpolation is inserted between scanning lines of the current field, there is obtained a low correlation between each of the scanning lines of the current field and tile inserted scanning line. In contrast, in case where a scanning line corresponding to a correct image signal obtained by an interpolation is inserted, there is obtained a high correlation between each of the scanning lines of the current field and the inserted scanning line. Therefore, the judgement circuit 57 judges according to the correlation between the image signal representing the current field and the inter-field interpolation signal inserted between the scanning line of the current field whether or not a motion vector detected in a block is valid, and thus controls the switching circuit 58.

The intra-field interpolation circuit 56 performs an interpolation of scanning lines of the current field by using only the image information of the current field and obtains an intra-field interpolation signal. The switching circuit 58 selects and outputs the inter-field interpolation signal in case where the motion vector is judged to be valid, and selects and outputs the intra-field interpolation signal in case where the motion vector is judged to be invalid.

Then, the interpolation signal output from the switching circuit 58 is input to the non-interlaced signal output circuit 59 whereupon a scanning line corresponding to the interpolation signal is inserted between the scanning lines represented by the image signals of the current field. Thus a non-interlaced image signal representing an image, the picture quality of which hardly is degraded, is output from the non-interlaced signal output circuit 59.

The operation of the second embodiment is performed as described hereinabove. Next, an operation of the judgement circuit 57 will be described hereinbelow.

Figure 6:
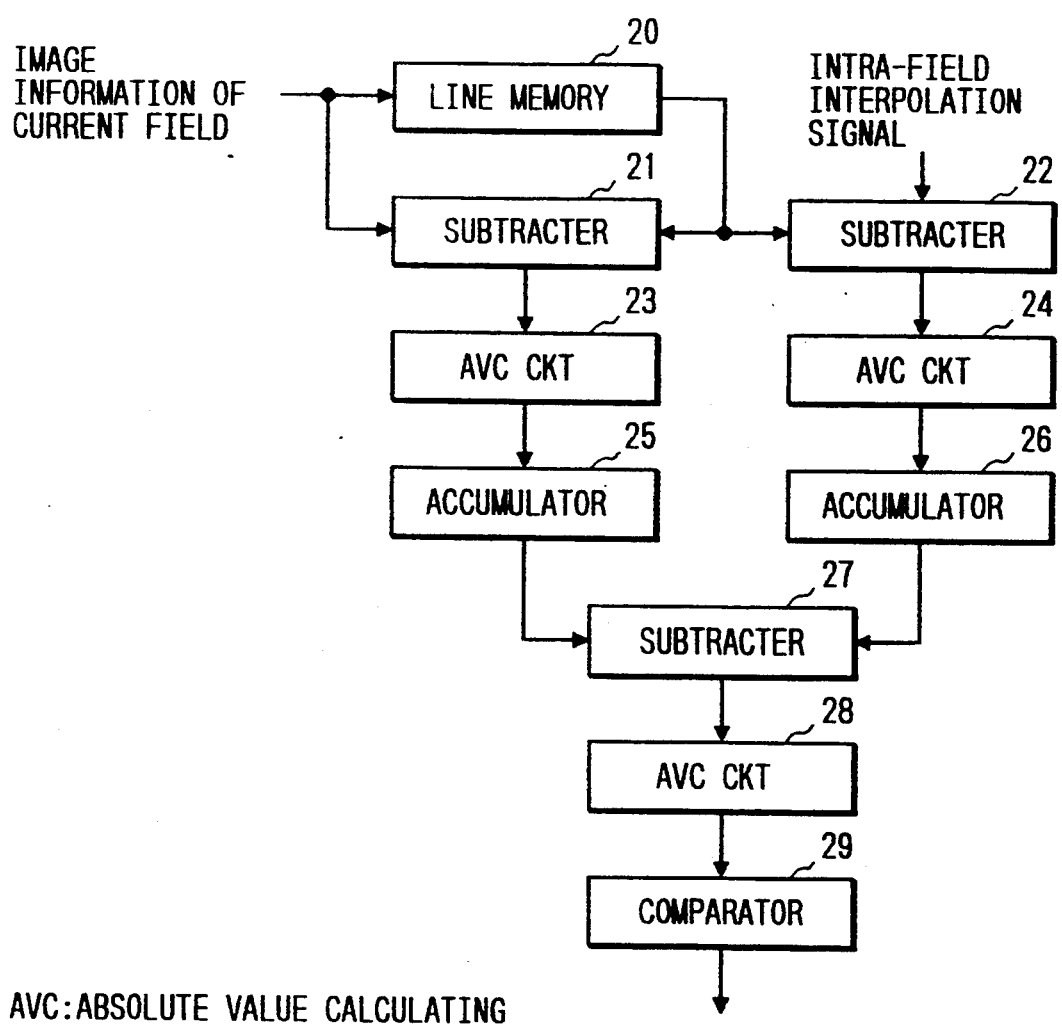
FIG. 6 is a schematic block diagram for illustrating a judgement circuit which is a primary part of the apparatus of FIG. 5.

Referring now to FIG. 6, there is shown the configuration of the judgement circuit 57 which is a primary part of the apparatus of FIG. 5. In FIG. 6, reference numeral 20 designates a line memory; 21, 22 and 27 subtracters; 23, 24 and 28 absolute-value calculating circuits; 25 and 26 accumulators; and 29 a comparating circuit.

Figure 7:
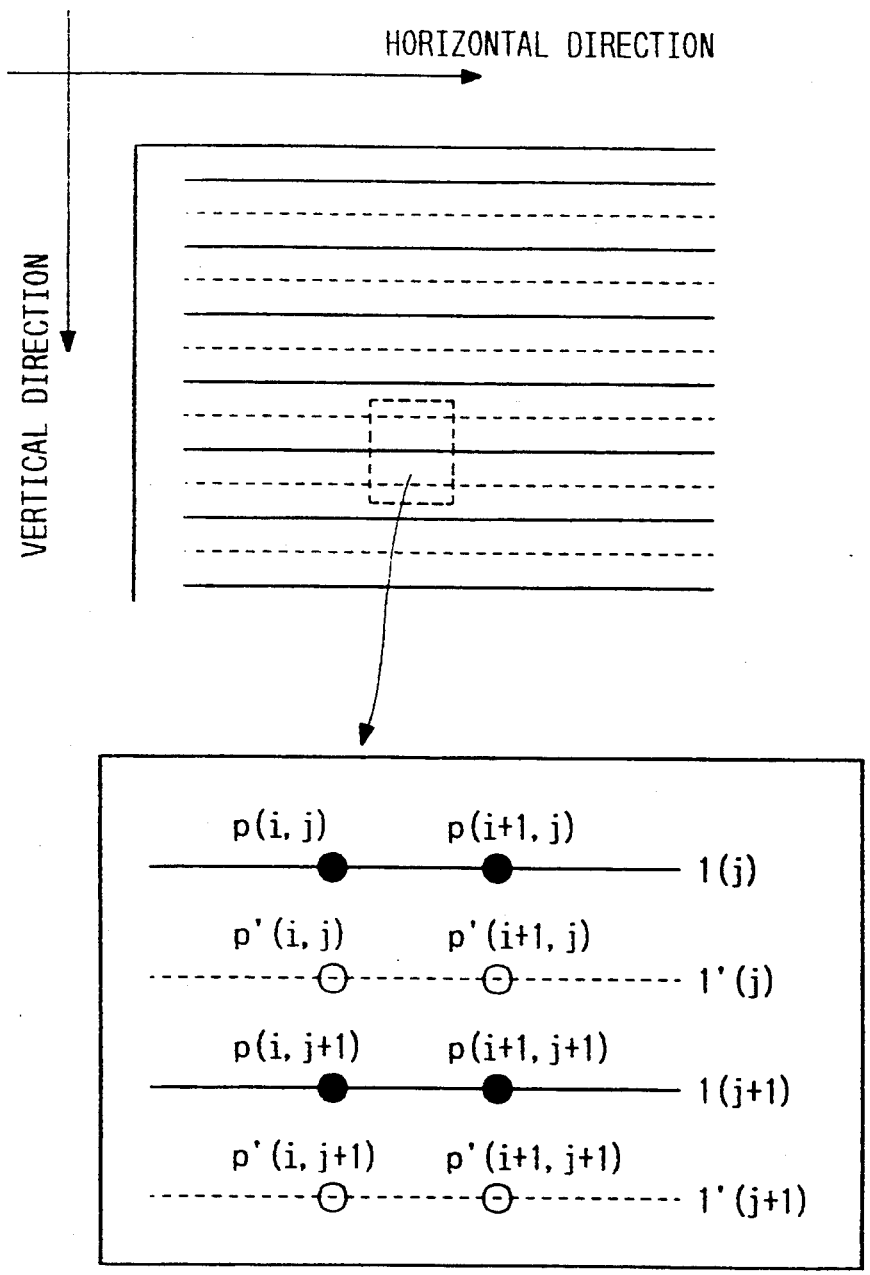
FIG. 7 is a diagram for illustrating an operation of the judgement circuit of FIG. 6.

Generally, there is a high correlation between neighbouring pixels. Thus, in case where a motion vector is correctly detected, there is obtained a high correlation between the inter-field interpolation signal and the image signal of the current field. Therefore, if an inter-field interpolation is performed as illustrated in FIG. 7, the validity of the motion vector can be determined by obtaining the absolute value $\delta'$ of the difference in luminance between a pixel p(i,j) on a scanning line l(j) of the current field and a pixel p'(i,J) on a scanning line l'(j) obtained as the result of the inter-field interpolation and also obtaining the absolute value $\delta$ of the difference in luminance between a pixel p(i,j) on a scanning line l(j) of the current field and a pixel p(i,j+1) on a scanning line l(j+1) thereof and then making a comparison between the value obtained by accumulating $\delta$ in each block and that obtained by accumulating $\delta'$ in each block. Namely, the absolute value $\delta'$ is obtained by the subtracter 22 and the absolute value calculating circuit 24 and thereafter a sum Xn of the absolute values $\delta'$ of each block is calculated by the accumulator 26. Similarly, the absolute value $\delta$ is obtained by the subtracter 21 and the absolute value calculating circuit 23 and thereafter a sum Yn of the absolute values $\delta$ of each block is calculated by the accumulator 25. Subsequently, the comparator 29 compares the absolute value $\Delta$ Sn of the difference between the sums Xn and Yn, which is obtained by the subtracter 27 and the absolute value calculating circuit 28, with a predetermined threshold value T. It is determined from the result of this comparison whether or not the motion vector is valid. Namely, in case where the absolute value $\Delta$ Sn is less than the threshold value T, the motion vector is judged to be valid. In contrast, in case where the absolute value $\Delta$ Sn is greater than or equal to the threshold value T, the motion vector is Judged to be invalid.

Figure 8:
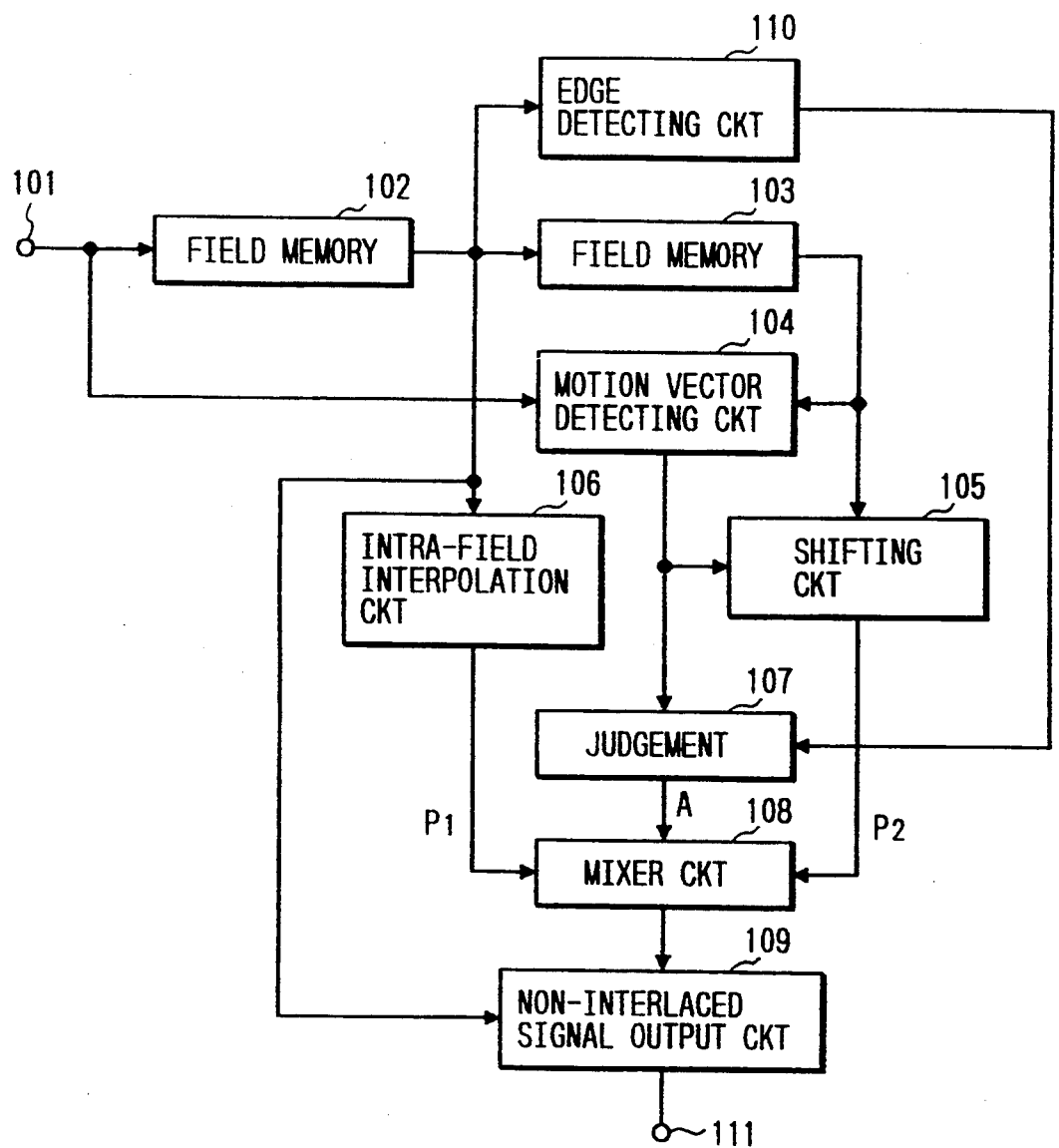
FIG. 8 is a schematic block diagram for illustrating the configuration of a further scanning-line interpolation apparatus embodying the present invention.

Hereinafter, a further scanning-line interpolation apparatus (hereunder sometimes referred to as a third embodiment) embodying the present invention. Referring to FIG. 8, there is shown the configuration of the third embodiment. Reference numeral 101 denotes an input terminal from which a signal representing image information obtained by a 2:1 interlaced scanning is input; 102 and 103 field memories for storing the image information; 104 a motion vector detecting circuit for detecting an inter-frame motion vector in each block; 105 a shift circuit; 106 an intra-field interpolation circuit; 107 a judgement circuit; 108 a mixer circuit; 109 a non-interlaced signal output circuit; 110 an edge detecting circuit for detecting the presence of an edge in each of blocks, which are the same as blocks employed for detecting the motion vectors; and 111 an output terminal from which image information represented by the non-interlaced signal is output.

Hereinafter, an operation of the scanning-line interpolation apparatus of FIG. 8 will be described. First, a signal representing the 2:1 interlaced image information of a succeeding field is supplied to the input terminal 101. Further, a signal representing the image information of a current field is output from the field memory 102. Moreover, a signal representing the image information of a preceding field is output from the field memory 103.

Figure 9A:
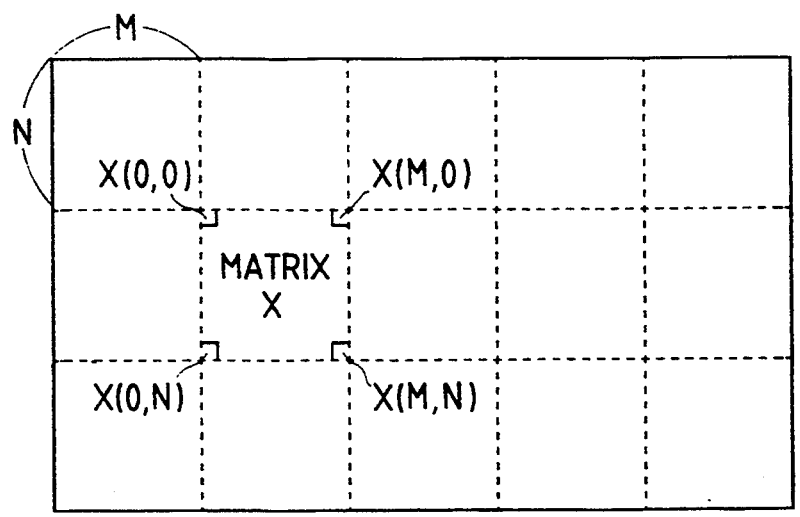
FIG. 9 is a diagram for illustrating an operation of a motion vector detecting circuit, which is included in a primary part of the apparatus of FIG. 8.
Figure 9B:
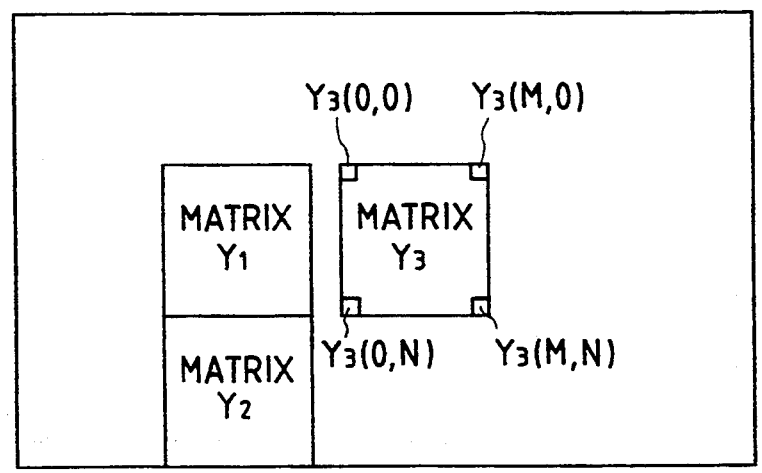
Figure 10:
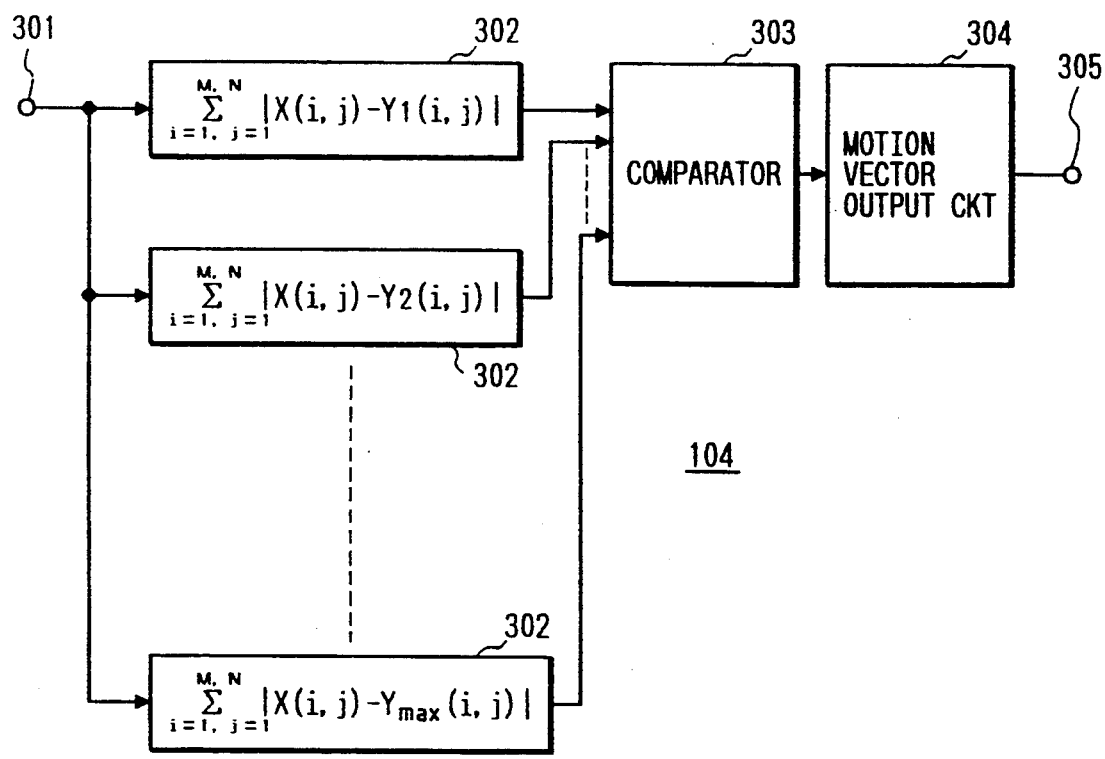
FIG. 10 is a schematic block diagram for illustrating the configuration of the motion vector detecting circuit, which is included in the primary part of tile apparatus of FIG. 8.

The signal representing the image information of the preceding information output from the field memory 103, as well as the signal representing the image information of the succeeding field supplied to the input terminal 101, is input to the motion vector detecting circuit 104 whereupon a processing of detecting an inter-frame motion vector is performed in each block by employing what is called a block matching method. Namely, as illustrated in FIG. 9(a), pixels of an image of tile succeeding field is first partitioned into blocks, each of which has M×N pixels (incidentally, M and N are positive integers). Let X(1,1) to (M,N) of a matrix X denote the values of the luminance of pixels of a block in question of the succeeding field; $Y_1(1,1)$ to $Y_1(M,N)$ of a matrix $Y_1$ denote the values of the luminance of pixels of a block of the preceding field, which has M×N pixels and corresponds to the block in question of the succeeding field; and Yn(1,1) to Yn(M,N) of a matrix Yn denote the values of the luminance of pixels, which are located at positions found by shifting the pixels of the block corresponding to the matrix $Y_1$ by MVn pixels, of a block of the preceding field, which has M×N pixels (incidentally, MVn is an integer; n a positive integer of from 1 to max; max a positive integer representing the number of candidates as a motion vector of each block). The detailed configuration of the motion vector detecting circuit 104 is illustrated in FIG. 10. When signals indicating such values of the luminance of pixels are input from an input terminal 301 of FIG. 10, a sum-of-absolute-value calculating circuit 302 calculates a sum Zn of the absolute values of the differences between the values X(1,1) to X(M,N) of the luminance of the pixels of the succeeding field and the values $Y_1(1,1)$ to $Y_1(M,N)$ of the luminance of the pixels of the preceding field. Namely, the sum Zn is obtained by $$Zn = \Sigma |X(i,j) - Yn(i,J)| \quad (n=1,2, \ldots max) \qquad (2)$$

Further, a matrix Yn, which gives a minimum sum Zn, is detected by a comparator 303. An inter-frame motion vector detected by performing the block matching method is a vector having the magnitude of MVn, which is a parallel-shift amount from the matrix Yn to the matrix $Y_1$, and the direction which is the same as that of the parallel shift from the matrix Yn to the matrix $Y_1$. A motion vector output circuit 304 of the motion vector detecting circuit 104 outputs a signal representing the inter-frame motion vector to both of the shift circuit 105 and the judgement circuit 107.

Moreover, the image signal of the preceding field output from the field memory 103 is also input to the shift circuit 105 whereupon the input image signal is converted into a inter-field interpolation signal $P_2$ representing the result of parallel shifting pixels of an image represented by the input image signal of the preceding field by a distance, which is one-half the magnitude of the inter-frame motion vector input from the motion vector detecting circuit 104 (namely, the magnitude of the inter-field motion vector). Subsequently, the inter-field interpolation signal $P_2$ is output to the mixer circuit 108.

Figures 11A, 11B:
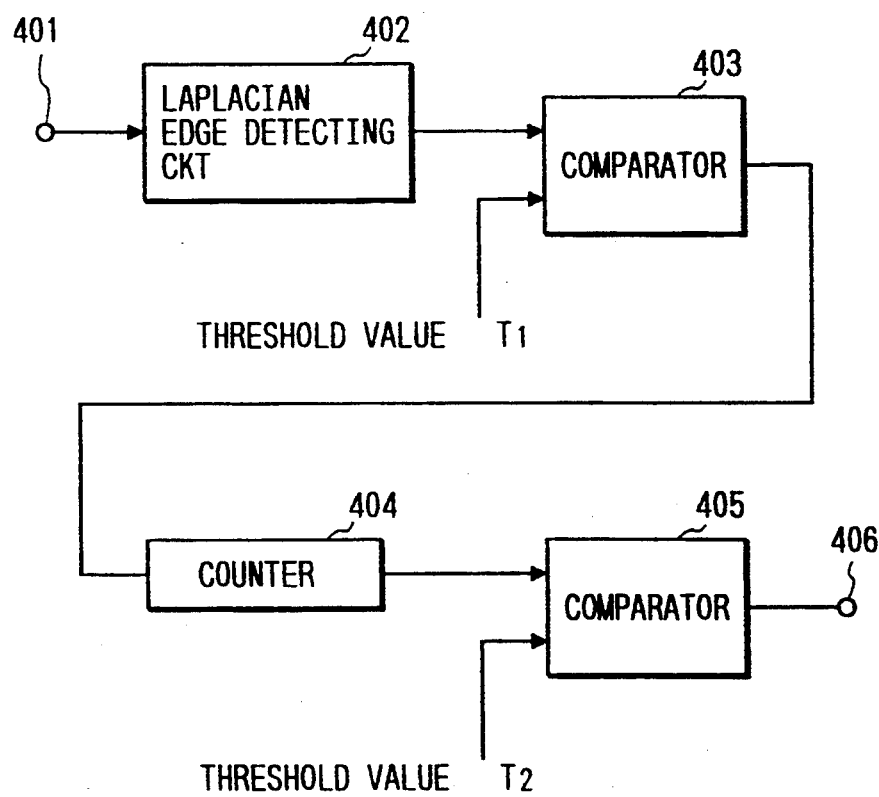
FIG. 11 is a schematic block diagram for illustrating the configuration of an edge detecting circuit, which is included in the primary part of the apparatus of FIG. 8.

On the other hand, the image signal of the current field output from tile field memory 102 is input to the edge detecting circuit 110 whereupon a processing of detecting the presence of an edge is performed on blocks which are the same as the blocks employed for the detection of the motion vector. In case of the third embodiment, the processing of detecting the presence of an edge is performed by applying an edge detecting operator, which is Laplacian of FIG. 11(a), on each pixel of each block by the circuit as illustrated in FIG. 11(b). As the result, if the number of pixels, each of which has a level greater than a predetermined threshold value $T_1$, of a block is more than or equal to that of pixels, each of which has a level greater than a predetermined threshold value $T_z$, thereof, it is judged that there is an edge in the block. Incidentally, as described above, Laplacian is used as an edge detecting means to be employed in the edge detecting circuit. Any other edge detecting means may be used instead of Laplacian. Then, an presence-of-an-edge signal representing the result of the processing of detecting an edge is output to the judgement circuit 107.

If an inter-field interpolation is effected by using an incorrect motion vector when an interpolation of scanning lines is performed, an image, which is different from an original image, is inserted into the original image. This causes degradation in picture quality. Therefore, it is necessary to determine tile correctness of the detected motion vector. As previously stated, if there is a high correlation between a motion vector detected in a block in question and another motion vector detected in each block adjacent to the block in question, the motion vector detected in a block in question can be Judged to be correct. Conversely, if there is a low correlation between a motion vector detected in a block in question and another motion vector detected in each block adjacent to the block in question, the motion vector detected in a block in question can be judged to be incorrect. Moreover, it is confirmed that human visual perception extracts structural features such as edge portions included in an image. Hence, if a motion vector detected in a block containing an edge portion is incorrect, there occurs deterioration in picture quality of an edge portion, which is especially apt to come under a viewer's notice. Consequently, this results in degradation in visual picture quality of an entire image.

Figure 12:
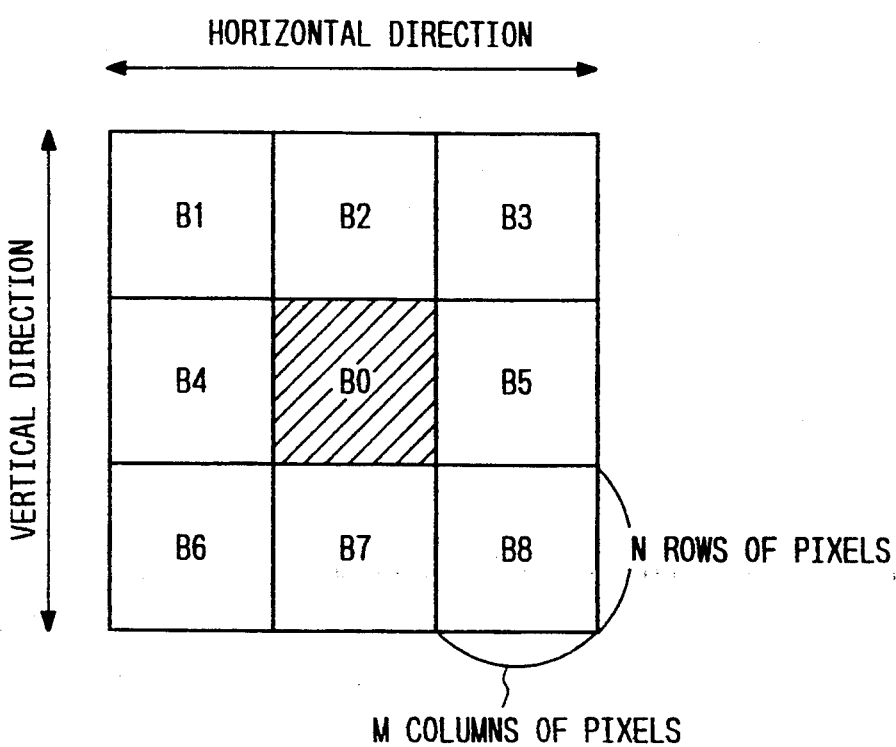
FIG. 12 is a schematic block diagram for illustrating the configuration of a judgement circuit, which is included in the primary part of the apparatus of FIG. 8.

Thus, tile following judgement is effected by using the inter-frame motion vector output from the motion vector detecting circuit 104 and tile presence-of-an-edge signal output from the edge detecting circuit 110. FIG. 12 shows a block in question and blocks adjacent thereto. First, the circuit calculates the difference Dn between a motion vector $V_o$ detected in the shaded block $B_o$ in question and each of motion vectors $V_1$ to $V_8$ respectively detected in the neighbouring blocks $B_1$ to $B_8$ (incidentally, n is an integer of from 1 to 8). If the difference Dn is less than a threshold value $T_3$, the motion vector $V_o$ detected in the block $B_o$ is Judged to be in agreement with the motion vector Vn detected In the block Bn. Further, the threshold value is changed depending on whether or not there is an edge in the block $B_o$. Namely, if there is an edge in the block $B_o$, the threshold value $T_3$ is controlled in such a manner to become small.

In this way, the judgement circuit 107 compares a motion vector $V_o$ detected in the shaded block $B_o$ in question with each of motion vectors $V_1$ to $V_8$ respectively detected in the neighbouring blocks $B_1$ to $B_8$ and finds the number A of the motion vectors, which are judged to be in agreement with the motion vector detected in the block $B_o$, of the neighbouring blocks $B_1$ to $B_8$ and further outputs a signal indicating the number A to the mixer circuit 108. Moreover, the image signal of the current field output from the field memory 102 is input to the intra-field interpolation circuit 106 whereupon a processing of obtaining signals to be inserted between the scanning signals of the current field is performed on the input image signal. Then, the signal thus obtained is output therefrom to the mixer circuit 108 as a intra-field interpolation signal $P_1$.

The intra-field interpolation signal $P_1$ output from the infra-field interpolation circuit 106 is mixed with the inter-field interpolation signal $P_2$ in the mixer circuit 108. At that time, a mixing ratio is changed in such a manner that a mixture signal (namely, àn interpolation signal) M obtained by mixing the signal $P_1$ with the signal $P_2$ is expressed as follows:

$$M = P_1 \times \{1 - (A/8)\} + P_2 \times (A/8) \qquad (3).$$

Incidentally, the equation (3) is mere an example. Any other equation may be employed as long as the ratio of the inter-field interpolation signal $P_2$ to the entire signal M is controlled in such a manner to increase when the number A increases. As the result, if the motion vector detected in the block in question is judged to be correct (namely, the number A is relatively large), the inter-field interpolation signal $P_2$ is mainly contained in the mixture signal. In contrast, if the motion vector detected in the block in question is judged to be incorrect (namely, the number A is relatively small), the intra-field interpolation signal $P_1$ is principally contained in the mixture signal. Thus, tile ratio of the inter-field interpolation signal $P_2$, which may cause deterioration in picture quality, to the interpolation signal M is controlled in such a fashion to decrease in case where the detected motion vector is incorrect. Further, the inter-polation signal obtained by mixing the inter-field interpolation signal $P_2$ with the intra-field interpolation signal $P_1$ is input to the non-interlaced signal output circuit 109.

Finally, the interpolation signal output from the mixer circuit 108 is inserted between scanning lines represented by the image signal of tile current field, which is output from the field memory 102, by the non-interlaced signal output circuit 109. Thus a non-interlaced image signal representing an image, the picture quality of which hardly is degraded, is output from the non-interlaced signal output circuit 109 and thus is obtained at the output terminal 111.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A scanning-line interpolation apparatus for an image represented by a plurality of blocks of picture elements, comprising:

a motion vector detecting circuit for detecting an interframe motion vector of each block of an image represented by image information of a succeeding field, from the image information of a preceding field and the succeeding field;

a judgement circuit for generating and outputting predetermined data by using the detected motion vector of each block of the succeeding field and motion vectors of corresponding neighbouring blocks thereof;

a mixer circuit for outputting an interpolation signal obtained by mixing an inter-field interpolation signal representing an image obtained by moving another image represented by image information of the preceding field by a distance, which is one-half the magnitude of the detected motion vector of each block of the image represented by the image information of the succeeding field, in the direction of the motion vector with an intra-field interpolation signal representing an image obtained by performing an interpolation of scanning lines of a current field by using only image information of the current field at a mixing ratio, which is changed according to the predetermined data output from the judgment circuit; and a non-interlaced signal output circuit for outputting a non-interlaced signal obtained from the interpolation signal and a signal representing the image information of the current field.

2. A scanning-line interpolation apparatus for an image represented by a plurality of blocks of picture elements, comprising:

a motion vector detecting circuit for detecting an interframe motion vector of each block of an image represented by image information of a succeeding field, from the image information of a preceding field and the succeeding field;

a judgment circuit for judging from a comparison of a difference between the detected motion vector of each block of the succeeding field and a motion vector of each of neighbouring blocks thereof with a threshold value whether or not the detected motion vector of each block thereof is in agreement with a motion vector of each of neighbouring blocks thereof;

a mixer circuit for outputting an interpolation signal obtained by mixing an inter-field interpolation signal representing an image obtained by moving another image represented by image information of the preceding field by a distance, which is one-half the magnitude of the detected motion vector of each block of the image represented by the image information of the succeeding field, in the direction of the motion vector with an intra-field interpolation signal representing an image obtained by performing an interpolation of scanning lines of a current field by using only image information of the current field at a mixing ratio, which is changed according to the number of the motion vectors of the neighbouring blocks, which are in agreement with the detected motion vector of each block; and a non-interlaced signal output circuit for outputting a non-interlaced signal obtained from the interpolation signal and a signal representing the image information of the current field.

3. A scanning-line interpolation apparatus for an image represented by a plurality of blocks of picture elements, comprising:

a motion vector detecting circuit for detecting an inter-frame motion vector of each block of an image represented by image information of a succeeding field, from the image information of a preceding field and the succeeding field;

a judgement circuit for calculating a difference between the detected motion vector of each block of the succeeding field and a motion vector of each of neighbouring blocks thereof and for detecting and summing up predetermined values respectively corresponding to the calculated differences;

a mixer circuit for outputting an interpolation signal obtained by mixing an inter-field interpolation signal representing an image obtained by moving another image represented by image information of the preceding field by a distance, which is one-half the magnitude of the detected motion vector of each block of the image represented by the image information of the succeeding field, in the direction of the motion vector with an intra-field interpolation signal representing an image obtained by performing an interpolation of scanning lines of a current field by using only image information of the current field at a mixing ratio, which is changed according to a total of the predetermined values respectively corresponding to the calculated differences; and a non-interlaced signal output circuit for outputting a non-interlaced signal obtained from the interpolation signal and a signal representing the image information of the current field.

* * * * *